United States Patent
Lo Presti et al.

(10) Patent No.: US 8,323,014 B2
(45) Date of Patent: Dec. 4, 2012

(54) EXPANDABLE BLADDER FOR TYRE-CURING APPARATUSES, A MANUFACTURING METHOD THEREOF, AND A PROCESS FOR MANUFACTURING TYRES FOR VEHICLE WHEELS

(75) Inventors: Gaetano Lo Presti, Milan (IT); Rodolfo Noto, Milan (IT); Ignazio De Gese, Milan (IT); Giovanni Pozzati, Milan (IT); Massimo Loprevite, Milan (IT)

(73) Assignee: Pirelli Pneumatici S.p.A., Milan (IT)

( * ) Notice: Subject to any disclaimer, the term of this patent is extended or adjusted under 35 U.S.C. 154(b) by 954 days.

(21) Appl. No.: 10/577,303

(22) PCT Filed: Oct. 31, 2003

(86) PCT No.: PCT/IT03/00707
§ 371 (c)(1), (2), (4) Date: Mar. 1, 2007

(87) PCT Pub. No.: WO2005/042243
PCT Pub. Date: May 12, 2005

(65) Prior Publication Data
US 2007/0246150 A1 Oct. 25, 2007

(51) Int. Cl.
*B29D 29/00* (2006.01)
*B29C 35/00* (2006.01)
*B29D 30/00* (2006.01)
(52) U.S. Cl. ............. 425/52; 425/44; 264/315; 156/123
(58) Field of Classification Search ............. 425/43, 425/44, 45, 52, 35, 36, 39, 51; 264/315, 264/501; 156/117, 123, 397, 126
See application file for complete search history.

(56) References Cited

U.S. PATENT DOCUMENTS

| 1,603,312 | A | * | 10/1926 | Burdette | 156/122 |
| 2,198,008 | A | * | 4/1940 | Iknayan | 152/511 |
| 2,995,095 | A | | 8/1961 | Rowe et al. | |
| 3,464,090 | A | * | 9/1969 | Cantarutti | 425/47 |
| 4,240,863 | A | * | 12/1980 | Vinton | 156/361 |
| 4,405,007 | A | | 9/1983 | Welter | |
| 4,698,245 | A | * | 10/1987 | Schallmeier et al. | 428/33 |
| 4,704,176 | A | | 11/1987 | Botzman | |
| 4,863,650 | A | | 9/1989 | Köhler et al. | |
| 5,211,898 | A | | 5/1993 | Shinmoto | |
| 5,221,406 | A | | 6/1993 | Laurent | |
| 5,250,142 | A | * | 10/1993 | Weimer et al. | 156/401 |

(Continued)

FOREIGN PATENT DOCUMENTS

DE 1228525 11/1966

(Continued)

OTHER PUBLICATIONS

Machine translation of Schallmeier (EP-160857A2), 3 pages.*

(Continued)

*Primary Examiner* — William Bell
(74) *Attorney, Agent, or Firm* — Finnegan, Henderson, Farabow, Garrett & Dunner, L.L.P.

(57) ABSTRACT

An expandable bladder has at least one first layer of butyl material and one second layer of silicone material, radially external to the first layer. The first and second layers have an undulated interface profile defining mechanical-engagement elements between the first and second elastomer materials. A process for manufacturing bladder as well as a tire molding and vulcanising apparatus incorporating the bladder.

10 Claims, 4 Drawing Sheets

U.S. PATENT DOCUMENTS

| | | | |
|---|---|---|---|
| 5,526,862 A | | 6/1996 | Ghilardi |
| 5,939,002 A | * | 8/1999 | Heindel .................. 264/219 |
| 6,095,217 A | | 8/2000 | Nakamura et al. |
| 6,279,633 B1 | | 8/2001 | Corvasce |
| 6,457,504 B1 | | 10/2002 | Caretta |
| 6,458,446 B1 | * | 10/2002 | Andronaco et al. .......... 428/161 |
| 6,598,646 B1 | | 7/2003 | Minami et al. |
| 2003/0122284 A1 | * | 7/2003 | Mori et al. .................... 264/501 |
| 2003/0127170 A1 | | 7/2003 | Cottin et al. |
| 2004/0103974 A1 | | 6/2004 | Majumdar et al. |
| 2005/0034802 A1 | * | 2/2005 | Shirasaka et al. ............. 152/564 |
| 2006/0096696 A1 | * | 5/2006 | Oku et al. .................... 156/117 |

FOREIGN PATENT DOCUMENTS

| | | | |
|---|---|---|---|
| DE | 2160337 | | 6/1973 |
| EP | 0105822 B1 | | 4/1984 |
| EP | 160857 A2 | * | 11/1985 |
| EP | 0160857 A2 | | 11/1985 |
| EP | 209453 A1 | * | 1/1987 |
| EP | 0685352 A1 | | 12/1995 |
| EP | 0970797 A2 | | 1/2000 |
| EP | 1279486 A2 | | 1/2003 |
| EP | 1454732 A1 | | 9/2004 |
| GB | 1075473 | | 7/1967 |
| JP | 57087939 A | * | 6/1982 |
| JP | 63125311 | | 5/1988 |
| JP | 03202326 A | * | 9/1991 |
| JP | 5031724 | | 2/1993 |
| JP | 05031724 A | * | 2/1993 |
| JP | 2002-046194 | | 2/2002 |
| JP | 2003011127 A | * | 1/2003 |
| WO | WO-00/35666 | | 6/2000 |
| WO | WO 01/94453 A1 | | 12/2001 |
| WO | WO 03041941 A1 | * | 5/2003 |

OTHER PUBLICATIONS

Nippon Oils & Fats; "Bladder for Vulcanising Formed Tyre is Corona Discharge Treated and Coated With Release Composition Containing Mainly Silicone Rubber"; Derwent Abstract of JP05192930 A, Aug. 3, 1993.

Toyo Rubber Ind. Co., Ltd.; "Bladder Preparation for Tyre Vulcanisation Comprises Applying Silicon Based Primer and Silicone Rubber Film Forming Agent"; Derwent Abstract of JP61215015 A, Sep. 24, 1986.

Office Action issued on Sep. 14, 2010 in related U.S. Appl. No. 11/665,995 (11 pages).

* cited by examiner

EXPANDABLE BLADDER FOR TYRE-CURING APPARATUSES, A MANUFACTURING METHOD THEREOF, AND A PROCESS FOR MANUFACTURING TYRES FOR VEHICLE WHEELS

CROSS REFERENCE TO RELATED APPLICATION

This application is a national phase application based on PCT/IT2003/000707, filed Oct. 31, 2003, the content of which is incorporated herein by reference.

BACKGROUND OF THE INVENTION

1. Field of the Invention

The present invention relates to an expandable bladder for tyre-curing apparatuses made up of two or more elastomer materials having different compositions, disposed in several mutually-coupled layers, for example.

It is also an object of the invention to provide a method of manufacturing said bladder.

2. Description of the Related Art

In the embodiments that will be disclosed in the present description, the invention is conceived to be utilised within the scope of tyre manufacturing processes, and more particularly in the moulding and vulcanisation steps of previously built green tyres.

It is known that in the manufacture of tyres for vehicle wheels a moulding and vulcanisation treatment is provided subsequently to a step involving building of the green tyre by assembling of the respective elastomer material components with appropriate reinforcing structures, said moulding and vulcanisation treatment aiming at determining the structural stabilisation of the tyre by cross-linking of its elastomer components and, if required, imparting a desired tread pattern thereto as well as possible graphic marks at the sidewalls.

To this aim, the green tyre is introduced into a suitably heated vulcanisation mould having a moulding cavity conforming in shape to the final conformation to be given to the tyre itself. After carrying out closing of the mould, a bladder of toroidal shape is allowed to expand within the tyre, which bladder in a radially internal position has at least one circumferential edge carrying tailpieces for anchoring to respective parts of the mould. Bladder expansion is obtained by admitting steam under pressure thereinto, so as to bring the bladder into contact with the inner tyre surface and compress the tyre against the moulding cavity walls, with simultaneous heat transmission in an amount required for cross-linking.

When vulcanisation has been completed, the mould is opened to allow removal of the tyre and set the mould ready for a new vulcanisation cycle.

However, it is necessary to prevent the bladder from adhering to the inner walls of the tyre too much, to promote both adaptation of the bladder to the tyre conformation and tyre removal without any risk of damage at the end of vulcanisation.

As known, this requirement is tackled by resorting to surface treatments essentially consisting in disposing appropriate release agents usually applied by spraying, on the outer bladder surfaces and/or the inner tyre surfaces.

These treatments however involve different problems originating from the material employed as the release agent and the equipment and time required for carrying out the treatment itself. Surface treatments can also create problems in terms of environmental impact, because the materials used as the release agents can be dangerous, as well as in terms of production rejects that may occur each time the surface treatment is not uniformly carried out over the whole bladder/tyre contact surface.

The state of the art proposes different solutions to reduce adhesion of the vulcanisation bladder to the tyre surfaces. For instance, document JP 63125311 discloses how to manufacture an expandable bladder with an elastomer composition comprising an organic rubber and a polyorganosiloxane containing a specific silicone-modified elastomer as the solubilizing agent.

In document JP 5031724 use of an expandable layered bladder is proposed which has an inner elastomer layer consisting of butyl rubber and an outer elastomer layer consisting of silicone rubber. The inner layer of butyl rubber ensures a hermetic seal to steam under pressure, whereas the outer layer of silicone rubber facilitates sliding of the bladder on the inner tyre surfaces and release therefrom when vulcanisation is over.

SUMMARY OF THE INVENTION

The Applicant however has found that in manufacturing bladders of this type several difficulties are encountered for obtaining an efficient and reliable union between the inner and outer layers because they are made of different elastomer materials. In particular, the butyl and silicone polymeric bases are not very compatible with each other because they are not able to carry out cross-linking together, i.e. to form stable molecular bonds with each other, which impairs reliability and duration of the layered bladders made in accordance with the known art.

The Applicant has perceived that for obtaining a process advantageously employing a layered bladder it is necessary to provide an efficient attachment means between non compatible blends like the butyl one and silicone one, in order to avoid the above mentioned problems.

The Applicant has found that manufacturing the different layers of said bladder in such a manner as to obtain a mechanical engagement between the surfaces in contact makes it possible to produce bladders made of non compatible blends that are very reliable and of long duration for use internally of a tyre vulcanisation apparatus, because the forces tending to separate the different layers as a result of the moulding pressure are counteracted by the constraining reactions generated between the contact surfaces of the different layers as a result of said mechanical engagement.

More specifically, in accordance with the present invention, the different materials required in manufacturing a layered bladder are arranged in the form of a continuous elongated element and mutually coupled before or during winding of same on a toroidal support, so as to obtain a layered coating in which the materials are mutually joined according to an undulated interface profile defining complementary elements of mechanical engagement between the materials themselves. By suitably selecting the shape and mutual arrangement of the elongated elements, the conformation of the undulated interface profile can be controlled with a wide margin, for example as regards the wave width and pitch, so as to increase the coupling surface between the materials.

In accordance with the present invention, there is provided an expandable bladder for tyre-vulcanising apparatuses, having a toroidal conformation comprising:

at least one first layer of a first elastomer material and one second layer of a second elastomer material different from said first elastomer material;

wherein said second layer is at a position radially external to said first layer;

wherein said first and second layers have an undulated interface profile; and wherein said interface profile defines mechanical-engagement elements between the first and second elastomer materials.

There is also provided in accordance with the present invention, a method of manufacturing an expandable bladder for tyre-vulcanising apparatuses, comprising the steps of:

preparing at least one first elongated element including a first raw elastomer material and at least one second elongated element including a second raw elastomer material having a different composition from that of the first elastomer material;

laying said first elongated element on said toroidal support in the form of coils wound around a geometric axis of said toroidal support so as to form a first layer of said first elastomer material;

laying said second elongated element on a toroidal support in the form of coils wound around the geometric axis of said toroidal support so as to form a second layer of said second elastomer material at a radially external position to said first layer, said first and second layers having an undulated interface profile wherein said interface profile defines mechanical-engagement elements between the first and second elastomer materials; and vulcanising said bladder.

In another aspect of the present invention, there is provided a process for manufacturing tyres comprising the steps of:

building a green tyre;

inserting said green tyre into a mould;

supplying heat to said green tyre to obtain cross-linking of the elastomer material of which it is made;

moulding said green tyre against the walls of said mould through expansion of an expandable bladder placed within said tyre when the latter is enclosed in said mould; and extracting the moulded and vulcanised tyre from said mould wherein said expandable bladder has a toroidal conformation and comprises:

at least one first layer of a first elastomer material and one second layer of a second elastomer material different from said first elastomer material;

wherein said second layer is at a position radially external to said first layer;

wherein said first and second layers have an undulated interface profile; and wherein said interface profile defines mechanical-engagement elements between the first and second elastomer materials.

In accordance with the present invention, there is also provided a vulcanisation apparatus for tyres of vehicle wheels, comprising:

a mould having a plurality of cheeks and sectors adapted to define, by moulding, a tread pattern on the tread band of the tyre and a plurality of graphic marks on the sidewalls of the same tyre;

devices to supply heat to the green tyre to be vulcanised to enable cross-linking of the latter, said devices being operatively associated with said mould; and an expandable bladder operatively associated with said mould to exert pressure from the inside to the outside on said green tyre bringing said green tyre into contact with said cheeks and sectors of said mould during the moulding step, wherein the expandable bladder has a toroidal conformation and comprises:

at least one first layer of a first elastomer material and one second layer of a second elastomer material different from said first elastomer material;

wherein said second layer is at a position radially external to said first layer;

wherein said first and second layers have an undulated interface profile; and wherein said interface profile defines mechanical-engagement elements between the first and second elastomer materials.

BRIEF DESCRIPTION OF THE DRAWINGS

Further features and advantages will become more apparent from the detailed description of a preferred but not exclusive embodiment of an expandable bladder for tyre-vulcanising apparatuses, of the related manufacturing method, as well as of a process and apparatus for manufacturing tyres for vehicle wheels in accordance with the present invention. This description will be set out hereinafter with reference to the accompanying drawings, given by way of non-limiting example, in which.

DETAILED DESCRIPTION OF THE INVENTION

With reference to the drawings, an expandable bladder for tyre-vulcanising apparatuses in accordance with the present invention has been generally identified by reference numeral 1.

Figure 1:
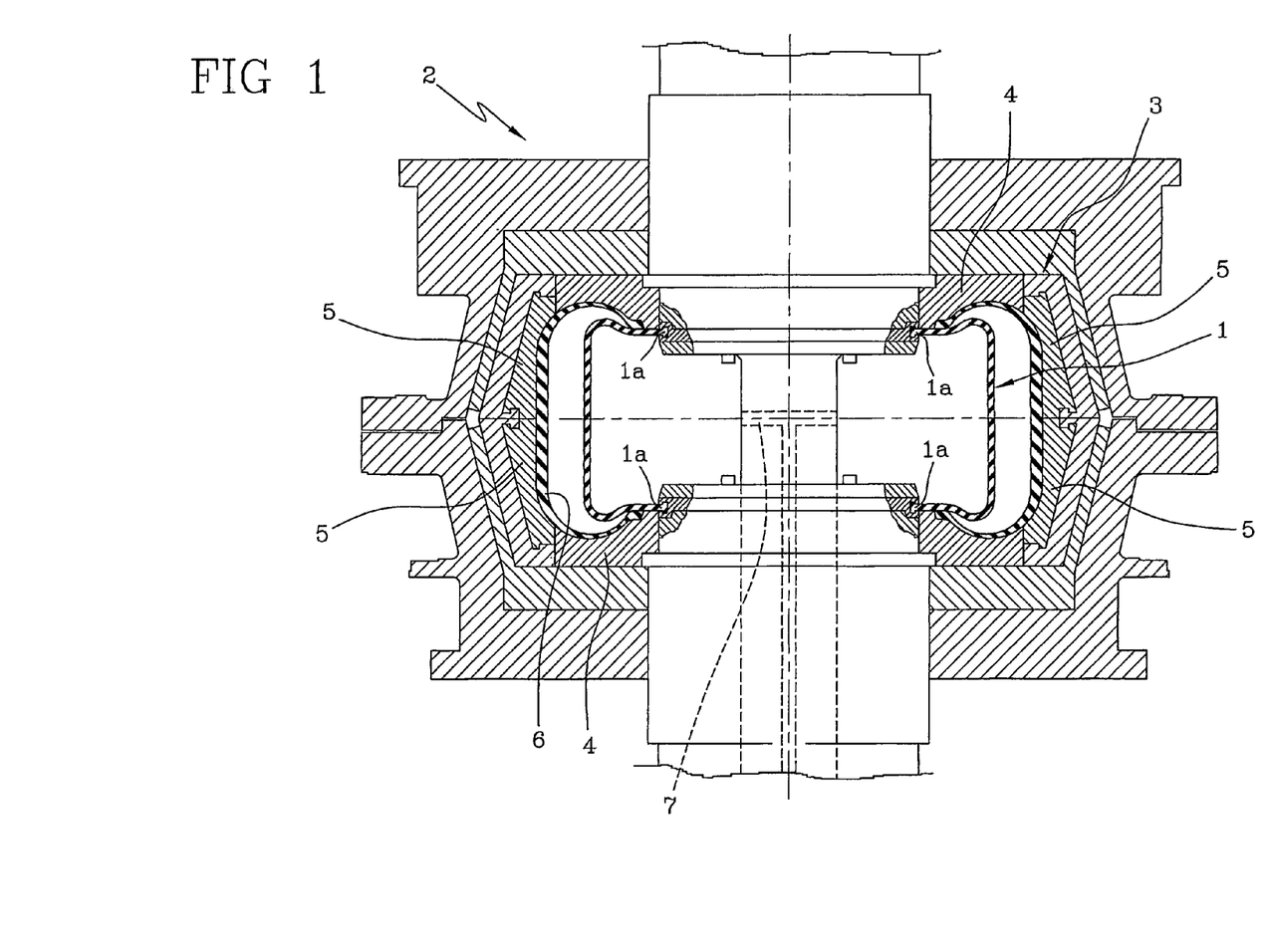
FIG. 1 diagrammatically shows, in diametrical section, a vulcanising apparatus incorporating an expandable bladder in accordance with the invention, during its expansion step within the tyre to be vulcanised.

Bladder 1 lends itself to be employed in combination with a vulcanisation apparatus generally denoted at 2 in FIG. 1, comprising a mould 3 having a plurality of cheeks 4 and sectors 5 that, when the mould is closed, define a moulding cavity adapted to receive a tyre being processed.

Bladder 1 of a substantially toroidal conformation, has at least one circumferential edge, and preferably two edges carrying respective anchoring tailpieces 1a, to be sealingly engaged in mould 3 to operatively associate the bladder itself with apparatus 2. A duct 7 for feeding steam or other working fluid and formed in mould 3 opens into said bladder 1 so as to enable bladder expansion following admission of steam under pressure, to compress tyre 6 against cheeks 4 and sectors 5. By effect of pressing, appropriate land portions arranged on sectors 5 and cheeks 4 cause formation of a desired tread pattern on the thread band of tyre 6, as well as a plurality of graphic marks on the tyre sidewalls.

Also operatively associated with mould 3 at cheeks 4 and/or sectors 5 are devices designed to supply heat to the green tyre 6 to be vulcanised, which devices co-operate with the steam introduced into the expandable bladder 1 to cause cross-linking of the elastomer material of which the tyre itself is made.

When the cycle has been completed, the moulded and vulcanised tyre 6 is disengaged from the expandable bladder 1 and extracted from mould 3, after opening of the latter.

Figure 2:
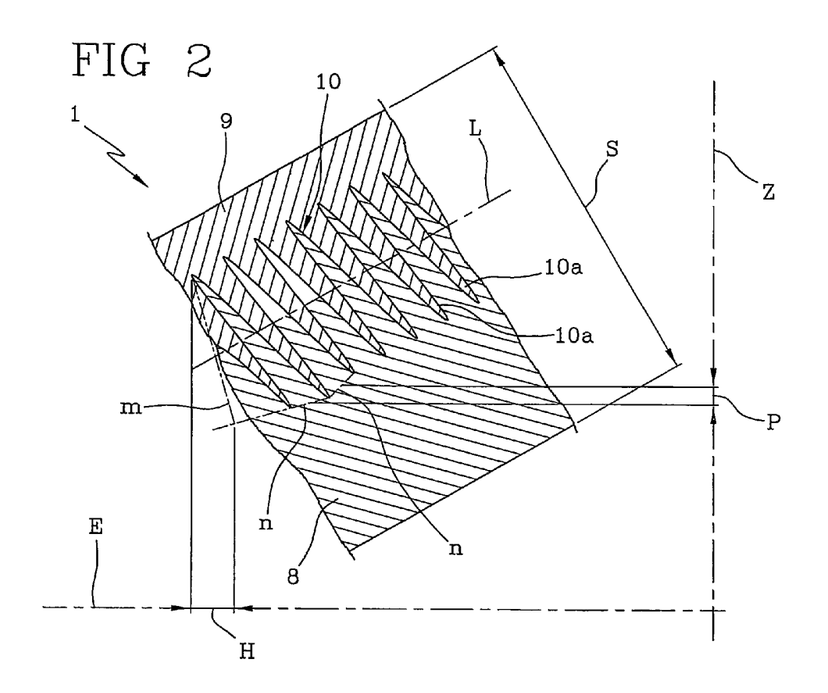
FIG. 2 is a fragmentary cross-section view of the bladder in FIG. 1 to an enlarged scale.

The expandable bladder 1 is advantageously comprised of at least one first layer 8 of a first elastomer material, and one second layer 9 of a second elastomer material different from the first elastomer material and placed at a radially external position with respect to the first layer 8. The first and second layers 8, 9 are advantageously coupled at an undulated interface profile 10 defining mechanical-engagement elements 10a between the first and second layers 8, 9.

In a preferential embodiment, the first elastomer material forming layer 8 placed at a radially internal position consists of a butyl-based blend so as to ensure a hermetic seal to steam under pressure fed into the expandable bladder 1.

The second elastomer material forming the second layer 9 in turn preferably consists of a silicone-based blend, so as to promote sliding of bladder 1 against the inner surface of tyre 6 in the expansion step, and allow an easy release of bladder 1 from tyre 6 when vulcanisation is over.

As shown in FIG. 2, a wave pitch P and a wave height H can be identified in the undulated interface profile 10. In the present description and in the following claims by wave "pitch" of the interface profile it is intended the distance P measured in an axial direction in right section between the median points of two consecutive waves. In the context of the present definition, the median point of each wave is the mean point of segment "n" joining the opposite radially inner ends of said wave. In FIG. 2 the line Z on which value P is indicated is parallel to the geometric axis of bladder 1 and therefore represents the axial direction.

Finally, in the present description and in the following claims by "height" of each wave of said interface profile it is intended projection H on a plane E parallel to the equatorial plane of bladder 1, of a segment "m" extending in a right-section plane perpendicularly to segment "n" joining said radially inner wave ends, or to the extension of the segment itself, between said segment or the segment extension and the radially outermost point of the wave.

To enable an efficient mechanical engagement between layers 8 and 9, the wave height H is preferably equal to or higher than one tenth of, and preferably higher than half the wave pitch P, so as to obtain effective mechanical-engagement elements 10a also in the absence of undercuts.

In the embodiment shown in FIG. 2, the wave height H is as high as about five times the value of the wave pitch P.

Figures 4, 5, 6, 7:
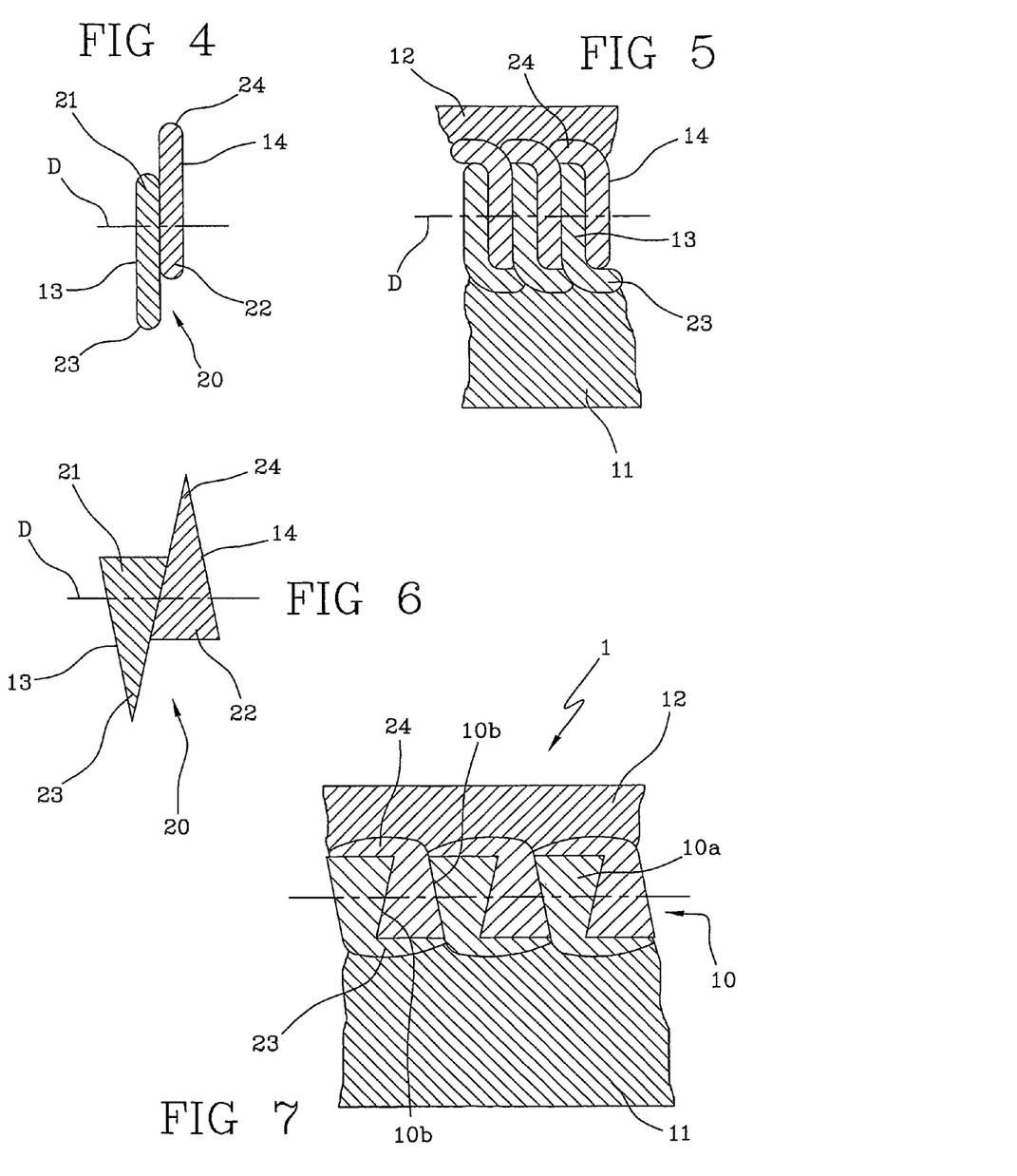
FIG. 4 diagrammatically shows a continuous strip-like element in cross section to be obtained from mutual coupling between the first and second elongated elements, close to the plane along line IV-IV in FIG. 3 for example.
FIG. 5 shows, by way of example, a deposition diagram of the continuous strip-like element in the form of coils disposed close to each other to obtain an expandable bladder as shown in FIG. 2.
FIG. 6 diagrammatically shows a continuous strip-like element in cross-section to be obtained by coupling a first and a second elongated elements into a triangular conformation, according a possible alternative embodiment of the invention.
FIG. 7 is a fragmentary section view of a deposition diagram of the continuous strip-like element in FIG. 6 in the form of coils disposed close to each other.

In addition or as an alternative to the above description, the complementary mechanical-engagement elements 10a defined by the interface profile 10 may be provided to have portions 10b of mutual undercut constraint, as shown in FIG. 6.

As viewed from FIGS. 5 and 7, a third layer of elastomer material 11 may be further provided, said layer being disposed at a radially internal position to the first layer 8 and being cross-linked with the elastomer material forming the first layer.

If required, a fourth layer of elastomer material 12 may be also arranged at a position radially external to the second layer 9, said fourth layer being cross-linked with the elastomer material belonging to at least the second layer itself.

In a preferential technical solution, the bladder has an overall thickness S included, just as an indication, between 3 and 8 mm, equal to about 5 mm for example. The radially internal portion of bladder 1 formed of the first layer 8 and the possible third layer 11 preferably has a thickness, measured with reference to a median line L of the undulated interface profile 10, greater than ½ and preferably corresponding to at least ⅗, of the overall thickness S of the bladder.

The thickness of the radially external portion of bladder 1, made up of the second layer 9 and the possible fourth layer 12, will be advantageously reduced to no more than half the overall thickness S, to the benefit of the bladder manufacturing costs, since the butyl-based blend is less expensive than the silicone-based blend.

Figure 3:
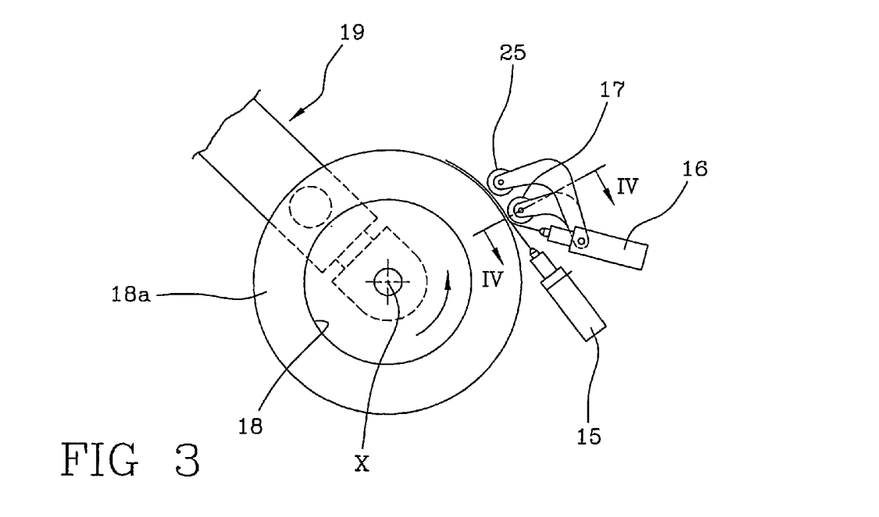
FIG. 3 laterally shows a diagram of the simultaneous laying of a first and a second elongated elements on a toroidal support, for the purpose of manufacturing the expandable bladder in reference.
Figure 3A:
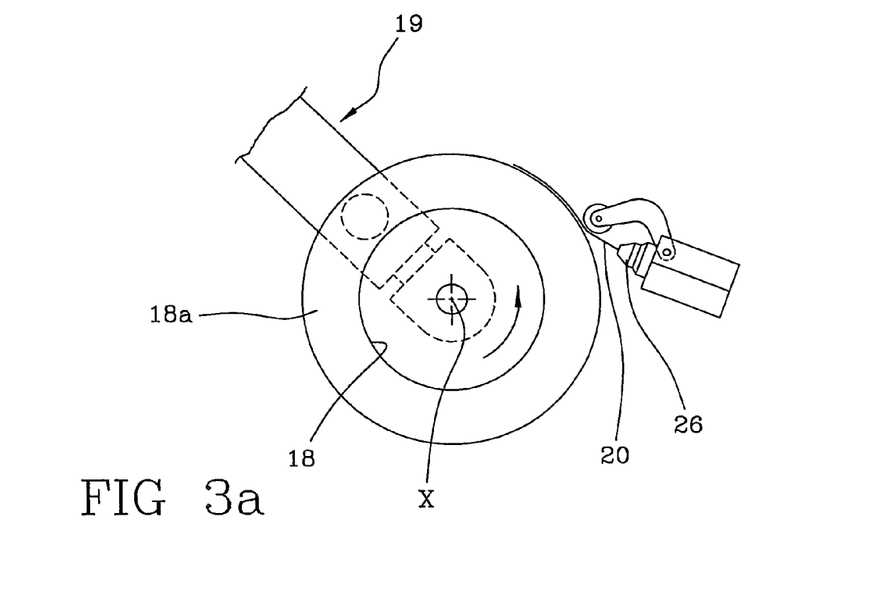
FIG. 3a laterally shows a diagram of the simultaneous laying of a first and a second elongated elements on a toroidal support, in accordance with a possible alternative embodiment.

Manufacture of the expandable bladder 1 described above contemplates preparation of a first elongated element 13 and a second elongated element 14 made of the first and second raw elastomer materials, respectively. The first and second elongated elements, obtained by extrusion and fed from a first 15 and a second 16 extruder respectively, are guided to at least one roller 17 or other delivery member that lay them down on a deposition surface 18a of a toroidal support 18 of a shape matching that of the expandable bladder to be obtained. The toroidal support 18 is preferably supported by a robotized arm 19 only partly shown as known from document WO 00/35666 A1 in the name of the same Applicant. The robotized arm 19 gives the toroidal support 18 a circumferential-distribution rotatory motion around the geometric rotation axis X thereof, by effect of which a circumferential distribution of the elongated elements 13, 14 laid by the delivery roller 17 on the deposition surface 18a is caused. Simultaneously, the robotized arm 19 moves the toroidal support 18 in front of the delivery roller 17 by controlled relative displacements of transverse distribution, so that the first and second elongated elements 13, 14 laid on the deposition surface 18a are formed into coils wound around the geometric axis X of the toroidal support 18.

On coming out of the respective extruders 15, 16, the first and second elongated elements 13, 14 are guided in converging directions with respect to each other, towards a point of mutual coupling in which the elongated elements themselves meet and adhere to each other forming a continuous strip-like element 20 that is laid and distributed on the toroidal support 18 as above described.

In the example in FIG. 3, the coupling point of the elongated elements 13, 14 is coincident with application of same to the toroidal support 18 by the delivery roller 17. However said elongated elements 13, 14 can be also guided in such a manner as to cause coupling of same at a point upstream of the toroidal support 18. It may be also provided that the continuous strip-like element 20 should come from a supply reel, used in a storage step of the strip-like element itself after carrying out mutual coupling of the elongated elements 13, 14.

In a further alternative embodiment, the elongated elements 13, 14 can be co-extruded and directly coupled in the extrusion head of a single extruder 26 (FIG. 3b) so that the strip-like element 20 is directly generated at the extruder outlet.

Figure 3B:
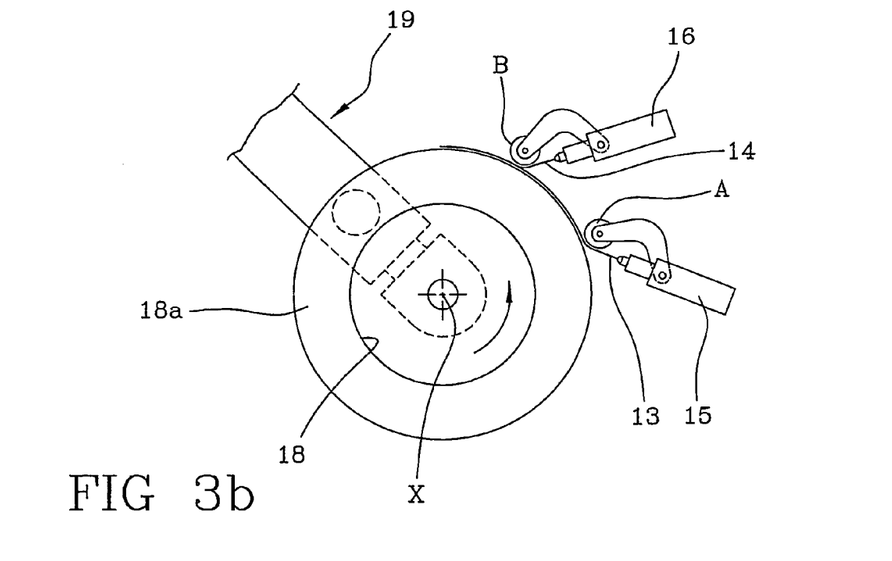
FIG. 3b laterally shows a diagram of the simultaneous laying of a first and a second elongated elements on a toroidal support, in accordance with a further alternative embodiment.

Finally, in a different embodiment shown by way of example in FIG. 3b, the elongated elements 13, 14 can be simultaneously laid on the toroidal support 18 at points A, B that are mutually spaced apart in a circumferential direction. In this instance, the coupling point between the elongated elements is coincident with the application point of the second elongated element 14 onto the toroidal support 18.

As can be viewed from FIGS. 4 and 6, the elongated elements 13, 14 are mutually coupled in such a manner that, when coupling has occurred, each of them has a base portion 21, 22 in contact with the base portion of the other elongated element. In addition, at least one of the elongated elements 13, 14 may have an apex 23, 24 projecting from the base portion 21, 22, in a direction transverse to the direction of mutual alignment of the base portions themselves, denoted at D in said figures.

In more detail, in a preferential embodiment the elongated elements 13, 14 that can have a conformation substantially identical with each other, are coupled at mutually offset positions in a plane transverse to the mutual alignment direction D of the base portions 21, 22, so that each of them has a respective apex 23, 24 projecting in the opposite direction with respect to the apex of the other elongated element.

During laying on the toroidal support 18, mutual positioning of the elongated elements 13, 14 and/or orientation of the continuous strip-like element 20 formed by them is controlled in such a manner that, on coming close to the deposition surface 18a, the apex 23 of the first elongated element 13 is turned towards the toroidal support 18.

As can be clearly seen looking at FIGS. 5 and 7, apex 23 of the first elongated element 13 of butyl material, during application is deformed and it consequently bends towards the base portion 22 of the second elongated element 14, taking an interposed position between the second elongated element 14 and the toroidal support 18 so as to avoid a direct contact of the second elastomer material against the deposition surface 18a.

At the deposition surface 18a, the coils disposed consecutively in side by side relationship and formed by the first elongated element 13, by effect of bending of apex 23 as above described, give rise to a continuous layer of butyl material extending over the whole deposition surface 18a.

Apex 24 of the second elongated element 14, in turn, is oriented radially away from the deposition surface 18a presented by the toroidal support 18 and can be turned up against the base portion 21 of the first elongated element 13, so that the coils in side by side relationship formed by the second elongated element 14 cause formation of a continuous layer of silicone material.

If required, turning up of apex 24 of the second elongated element 14 can be assisted by a roller or other auxiliary applicator member 25, operating downstream of the delivery roller 17.

As a result of the deposition in the form of coils in side by side relationship, in addition, the base portions 21, 22 of the first and second elongated elements 13, 14 generate the interface profile 10 between the first and second layers.

If required, application of the first and second elongated elements 13, 14 can be preceded by application of the third layer 11 of butyl material or in any case of a material suitable for cross-linking with the first elastomer material forming the first elongated element 13. Formation of this third layer can take place in the same manner as previously described with reference to laying of the continuous strip-like element 20, i.e. through application of a continuous elongated element of elastomer material, coming from an extruder for example and formed into coils disposed consecutively in side by side relationship to cover the deposition surface 18a of the toroidal support 15.

Subsequently to laying of the first and second elongated elements 13, 14, application of the above mentioned fourth layer 12 may be also carried out, said layer being made of a silicone material or at all events a material suitable for cross-linking with the second elastomer material forming the second elongated element 14. Formation of the fourth layer 12 too can be carried out by applying a fourth elongated element of elastomer material coming from an extruder and formed into coils disposed consecutively in side by side relationship. The third and fourth elongated elements 11, 12 can be advantageously produced either by the same extruders 15, 16 used for formation of the first and second elongated elements 13, 14, or by specific extruders dedicated thereto.

In the presence of the third and/or fourth elastomer layers 11, 12, arrangement of apices 23, 24 projecting from the first and second elongated elements 13, 14 respectively may appear to be superfluous, as said third and fourth layers can be cross-linked with the material forming the base portions 21, 22 of the elongated elements 13, 14, respectively.

As shown in FIG. 5, the elongated elements 13, 14 can have a conformation with a substantially flattened cross-section. In this case an interface profile 10 as shown in FIG. 2 is preferably obtained, in which the wave height H is greatly higher than the wave pitch, so that the hills and valleys of the undulated profile will cause formation of the mechanical-engagement elements. Alternatively, as exemplified in FIGS. 6 and 7, the elongated elements 13, 14 can advantageously have a cross-section profile of triangular conformation. In this case the base portions 21, 22 of the coupled elongated elements 13, 14 give rise to formation, in the mechanical-engagement elements 10a, of portions 10b with an undercut constraint. The same effect is achieved using elongated elements 13, 14 having a trapezoidal cross-section profile.

When formation of layers 8, 9, 11, 12 on the toroidal support 18 has been completed, the expandable bladder 1 lends itself to be introduced into a mould to be submitted to a moulding and vulcanisation step that can be carried out in any convenient manner. During this step, in the same mould as used for moulding and vulcanisation of the bladder it is possible to inject elastomer material for causing formation of said third and/or fourth layers 11, 12 and/or of any other additional coating layer.

The present invention achieves important advantages.

In fact, any problem resulting from the difficulty of joining a silicone blend to a butyl blend in a steady and reliable manner can be brilliantly overcome so as to manufacture a very durable and reliable expandable bladder that eliminates the necessity to carry out surface treatments in order to promote adaptation of the bladder to the inner tyre conformation and removal of the tyre itself when vulcanisation has been completed.

In addition, the bladder in reference lends itself to be made in a simple and cheap manner, utilising machinery and equipment already provided in modern tyre-production cycles in which the elastomer components are obtained by winding elongated elements of raw elastomer material in the form of coils disposed in side by side relationship on a toroidal support, as described in document WO 00/35666 A1 in the name of the same Applicant.

The invention claimed is:

1. An expandable bladder for tyre-vulcanising apparatuses, having a toroidal conformation, comprising:
    at least one first layer of a first elastomer material and one second layer of a second elastomer material different from said first elastomer material;
    wherein said second layer is at a position radially external to said first layer;
    wherein said first and second layers are mutually coupled by an undulated interface profile;
    wherein said interface profile defines mechanical-engagement elements between the first and second elastomer materials;
    wherein the mechanical-engagement elements result in mechanical engagement between the at least one first layer and the at least one second layer,
    wherein said undulated interface profile comprises a continuous strip-like element extending around the geometric axis of the bladder according to circumferential coils in side by side relationship,
    wherein said continuous strip-like element comprises a first and a second elongated elements mutually coupled along their longitudinal extension, each elongated element comprising a base portion and an apex portion, the base portions of the elongated elements being in mutual contact and the apex portions of the elongated elements extending in a substantially transverse direction with respect to the direction of mutual contact between the base portions, and
    wherein said first and second elongated elements are each one interposed between two mutually opposite sides of the other.

2. The bladder as claimed in claim 1, comprising at least one circumferential edge carrying anchoring tailpieces.

3. The bladder as claimed in claim 1, wherein the interface profile has a wave height and a wave pitch in which the wave height is higher than or as high as one tenth of the wave pitch.

4. The bladder as claimed in claim 3, wherein the wave height is higher than half the wave pitch.

5. The bladder as claimed in claim 1, wherein said mechanical-engagement elements have portions of mutual undercut constraint.

6. The bladder as claimed in claim 1, wherein a third layer of elastomer material cross-linked with at least said first elastomer material is disposed at a position radially internal to said first layer.

7. The bladder as claimed in claim 1, wherein a fourth layer of elastomer material cross-linked with at least one of said first and second elastomer materials is disposed at a position radially external to said second layer.

8. The bladder as claimed in claim 1, wherein said first elastomer material comprises a polymeric butyl base and said second elastomer material comprises a polymeric silicone base.

9. A vulcanisation apparatus for tyres of vehicle wheels, comprising:
    a mould having a plurality of cheeks and sectors adapted to define, by moulding, a tread pattern on the tread band of the tyre and a plurality of graphic marks on the sidewalls of the same tyre;
    devices to supply heat to a green tyre to be vulcanised to enable cross-linking of the latter, said devices being operatively associated with said mould; and
    an expandable bladder operatively associated with said mould to exert pressure from the inside to the outside on said green tyre, bringing said green tyre into contact with said cheeks and sectors of said mould during the moulding step, wherein the expandable bladder has a toroidal conformation and comprises:
        at least one first layer of a first elastomer material and one second layer of a second elastomer material different from said first elastomer material;
    wherein said second layer is at a position radially external to said first layer;
    wherein said first and second layers are mutually coupled by an undulated interface profile;
    wherein said interface profile defines mechanical-engagement elements between the first and second elastomer materials;
    wherein the mechanical-engagement elements result in mechanical engagement between the at least one first layer and the at least one second layer,
    wherein said undulated interface profile comprises a continuous strip-like element extending around the geometric axis of the bladder according to circumferential coils in side by side relationship,
    wherein said continuous strip-like element comprises a first and a second elongated elements mutually coupled along their longitudinal extension, each elongated element comprising a base portion and an apex portion, the base portions of the elongated elements being in mutual contact and the apex portions of the elongated elements extending in a substantially transverse direction with respect to the direction of mutual contact between the base portions, and
    wherein said first and second elongated elements are each one interposed between two mutually opposite sides of the other.

10. The vulcanisation apparatus for tyres of vehicle wheels as claimed in claim 9, wherein said expandable bladder comprises at least one circumferential edge carrying anchoring tailpieces.

* * * * *